United States Patent
Chen et al.

(10) Patent No.: US 11,129,131 B2
(45) Date of Patent: Sep. 21, 2021

(54) CONFIGURATION OF A RAN BASED NOTIFICATION AREA FOR A USER EQUIPMENT IN RRC INACTIVE STATE

(71) Applicant: NEC CORPORATION, Tokyo (JP)

(72) Inventors: Yuhua Chen, Tokyo (JP); Chadi Khirallah, Tokyo (JP); Neeraj Gupta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/784,026

(22) Filed: Feb. 6, 2020

(65) Prior Publication Data

US 2020/0178204 A1    Jun. 4, 2020

Related U.S. Application Data

(63) Continuation of application No. PCT/JP2018/029637, filed on Aug. 7, 2018.

(30) Foreign Application Priority Data

Aug. 10, 2017 (GB) .................................... 1712862

(51) Int. Cl.
| | |
|---|---|
| *H04W 68/00* | (2009.01) |
| *H04W 4/029* | (2018.01) |
| *H04W 76/27* | (2018.01) |
| *H04W 8/08* | (2009.01) |
| *H04W 48/16* | (2009.01) |
| *H04W 60/00* | (2009.01) |

(52) U.S. Cl.
CPC ......... *H04W 68/005* (2013.01); *H04W 4/029* (2018.02); *H04W 8/08* (2013.01); *H04W 48/16* (2013.01); *H04W 60/00* (2013.01); *H04W 76/27* (2018.02)

(58) Field of Classification Search
CPC ..... H04W 76/27; H04W 76/19; H04W 76/28; H04W 74/0833; H04W 36/08
See application file for complete search history.

(56) References Cited

U.S. PATENT DOCUMENTS

2018/0220486 A1*  8/2018  Tseng .................... H04W 76/27
2019/0037635 A1*  1/2019  Guo ...................... H04W 76/27

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.3.0, Jun. 2017.
"Discussion on the RRC Inactive 1-21 Assistant information", Samsung, 3GPP TSG-RAN WG3 NR AdHoc, R3-172270, Jun. 2017.

(Continued)

*Primary Examiner* — Jamal Javaid
(74) *Attorney, Agent, or Firm* — Sughrue Mion, PLLC

(57) ABSTRACT

A communication system is disclosed in which a base station receives, from at least one further base station, information identifying at least one respective tracking area associated with at least one cell of each further base station. The base station also receives, from a core network, information identifying a registration area for a user equipment (UE). The base station defines, based on the received information identifying at least one respective tracking area and the received information identifying a registration area, a radio access network (RAN) based notification area for the UE.

2 Claims, 9 Drawing Sheets

(56) References Cited

OTHER PUBLICATIONS

Nokia et al, "Configuration and Encoding of Network Slicing", 3GPP TSG-RAN WG3 NR#2 Adhoc R3-172130, Jun. 2017.
Samsung, "TP on RAN Inactive Assistant Information for 38.300", 3GPP TSG-RAN WG3 NR AdHoc R3-172272, Jun. 2017.
Nokia et al., "RAN-based Notification Area", 3GPP TSG-RAN WG3 NR#2 Adhoc R3-172136, Jun. 2017.
"3rd Generation Partnership Project; Technical Specification Group Radio Access Network; NR; NR and NG-RAN Overall Description; Stage 2 (Release 15)", 3GPP TS 38.300 V0.6.0 Front page, Aug. 2017.
3rd Generation Partnership Project; Technical Specification Group Radio Access Network; Study on New Radio Access Technology; Radio Interface Protocol Aspects (Release 14), 3GPP TR 38.804 V14.0.0 Front page, Mar. 2017.
"NGMN 5G White Paper", V1.0, the Next Generation Mobile Networks (NGMN) Alliance Cited in the Specification.
International search report for Application PCT/JP2018/029637 dated Oct. 24, 2018.
"TS 23.501: System aspects of RRC_INACTIVE (baseline)", Qualcomm Incorporated, SA WG2 Meeting #121, S2-174058, 4 pages, May 15-19, 2017, Hangzhou, P.R. China
"Discussion on RAN specific notification area", Intel Corporation, 3GPP TSG RAN WG2 NR Adhoc Meeting, R2-1700331, 4 pages, Jan. 17-19, 2017, Spokane, USA.
"CN and RAN interactions for RRC_INACTIVE UEs", Ericsson, 3GPP TSG.RAN WG2 #96, Tdoc R2-168710, 4 pages, Nov. 14-18, 2016, Reno, Nevada, USA.
"3rd Generation Partnership Project; Technical Specification Group Radio Access Network; Study on New Radio Access Technology; Radio Interface Protocol Aspects (Release 14)", 3GPP TR 38.804 V14.0.0, Mar. 2017, 57 pages.
"3rd Generation Partnership Project; Technical Specification Group Radio Access Network; NR; NR and NG-RAN Overall Description; Stage 2 (Release 15)", 3GPP TS 38.300 V0.6.0, Aug. 2017, 58 pages.
British Search Report for GB1712862.0 dated Dec. 22, 2017.
Written Opinion of PCT/JP2018/029637 dated Oct. 24, 2018 (PCT/ISA/237).
Japanese Office Action for JP Application No. 2020-507123 dated Mar. 16, 2021 with English Translation.
Ericsson, "RAN area updating due to mobility in RRC_Inactive", 3GPP TSG-RAN WG2 #97, Tdoc R2-1700894, Athens, Greece, Feb. 13-17, 2017, pp. 1-4.
ZTE et al., "Consideration on the RAN based notification in RRC_Inactive", 3GPP TSG-RAN WG2 NR Ad Hoc, R2-1700277, Spokane, USA, Jan. 17-19, 2017.

* cited by examiner

CONFIGURATION OF A RAN BASED NOTIFICATION AREA FOR A USER EQUIPMENT IN RRC INACTIVE STATE

CROSS REFERENCE

This application is a Continuation of PCT International Application No. PCT/JP2018/029637 filed on Aug. 7, 2018, which claims priority under U.S.C. § 119(a) to United Kingdom Patent Application No. 1712862.0 filed on Aug. 10, 2017, the disclosure of which is incorporated herein in its entirety by reference.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof (including LTE-Advanced and Next Generation or 5G networks). The invention has particular although not exclusive relevance to improvements related to the tracking of user equipment whilst in an inactive state.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services. Various details of 5G networks are described in, for example, the 'NGMN 5G White Paper' V1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core network.

Under the 3GPP standards, an eNB in LTE (or gNB/NG-RAN node in 5G), is the base station via which communication devices (user equipment or 'UE') connect to a core network and communicate to other communication devices or remote servers. For simplicity, the present application will use the term base station to refer to any such base stations and use the term UE, user device, or UE to refer to any such communication device. The core network (i.e. the EPC in case of LTE) hosts functionality for subscriber management, mobility management, charging, security, and call/session management (amongst others), and provides connection for communication devices to external networks, such as the Internet.

Items of user equipment (UEs) might include, for example, mobile communication devices such as mobile telephones, smartphones, user equipment, personal digital assistants, laptop/tablet computers, web browsers, e-book readers and/or the like. Such mobile (or even generally stationary) devices are typically operated by a user. However, 3GPP standards also make it possible to connect so-called 'Internet of Things' (IoT) devices (e.g. Narrow-Band IoT (NB-IoT) devices) to the network, which typically comprise automated equipment, such as various measuring equipment, telemetry equipment, monitoring systems, tracking and tracing devices, in-vehicle safety systems, vehicle maintenance systems, road sensors, digital billboards, point of sale (POS) terminals, remote control systems, and the like. Effectively, the Internet of Things is a network of devices (or "things") equipped with appropriate electronics, software, sensors, network connectivity, and/or the like, which enables these devices to collect and exchange data with each other and with other communication devices. It will be appreciated that IoT devices are sometimes also referred to as Machine-Type Communication (MTC) communication devices or Machine-to-Machine (M2M) communication devices.

For simplicity, the present application refers generally to UEs in the description and it will be appreciated that the technology described can be implemented on any communication devices (mobile and/or generally stationary) that can connect to a communications network for sending/receiving data, regardless of whether such communication devices are controlled by human input or software instructions stored in memory.

Communication between UEs and base stations is controlled using a Radio Resource Control (RRC) layer based on an RRC protocol as defined in the current version of 3GPP TS 36.331. The RRC layer handles the control plane signalling of Layer 3 (network layer) between UEs and the radio access network, and includes, amongst other things, functions for broadcasting system information, paging, connection establishment and release, radio bearer establishment, reconfiguration and release, mobility procedures, and power control. In accordance with the current version of the RRC protocol, at any given time, a UE may operate either in an 'RRC idle mode' (in which no data communication takes place) or an 'RRC connected mode' (in which data communication may take place between the UE and its serving base station).

As UEs operating in the RRC connected mode move around in the area covered by the communication system, they are handed over from one cell (i.e. operated by a base station) to another cell (operated by the same or a different base station), depending on signal conditions and other requirements, such as requested quality of service, the type of service used, overall system load, and the like. Handover requires extensive signalling between the UE and the base stations (old and new) and also between the base stations and the core network as well.

On the other hand, whilst in the RRC idle mode, UEs are programmed to select a 'serving' cell, having a good quality signal, to camp on so that when new data is to be transmitted to/from these UEs, they can benefit from favourable signal conditions. In the event that an idle UE detects a new cell with better signal quality than the current serving cell, e.g. due to the UE changing its location, the UE can perform a so-called cell reselection procedure. However, an idle mode UE does not inform the network about the selected new cell as long as this cell is within the same 'tracking area (TA)' (i.e. a larger geographic area comprising a pre-defined set of cells), because the radio network transmits system information and UE specific paging messages within the whole TA thus making it possible to contact and initiate communication to/from the UE regardless of the current cell of the TA that the UE camps on. A Tracking Area identity (TAI) is used to identify each tracking area. The use of TAs has been extended by the so called "tracking area list concept" in which, when a UE registers with the network, a core network node (e.g. a mobility management entity (MME)) allocates a set (a "list") of TAs to the UE. By ensuring that the centre of this set of TAs is close to the UE's current location, the chance of a UE rapidly making another tracking area update can be reduced. In effect, the TA list (TAL) represents a core network defined area for a UE (referred to as a core network (CN) registration area).

In order to benefit from the lowest energy consumption and to free up valuable system resources, the UEs return to the RRC idle mode whenever possible and perform cell reselections (instead of handovers) as long as they remain within the same TA. The base station controls the transition between the various operating modes for each UE within its cell(s). Since the setting up and termination of an RRC connection between the base station and the UE requires exchanging of signalling messages and hence utilises valuable system resources, and also takes some time to complete, the transition from connected to idle mode is allowed under specific circumstances as defined in 3GPP TS 36.331. For example, the serving base station might instruct a UE to enter the RRC idle mode only after it has confirmed that there is no more data to be transmitted to/from the particular UE (e.g. both uplink (UL) and downlink (DL) buffers are empty).

When it registers its current location (e.g. cell) with the core network, each UE also has an associated '51' connection between its serving base station and the core network. The S1 connection is either in a so-called 'ECM-IDLE' mode (when the UE is in RRC idle mode) or in an 'ECM-CONNECTED' mode (when the UE is in RRC connected mode). The S1 connection is used for transferring data (control and user data) between the UE and the core network (and beyond) and it is maintained as long as the UE remains in the RRC connected mode. On the other hand, when a UE enters the RRC idle mode, its associated S1 connection is also terminated (or suspended) until the UE has more data to send or receive in which case a new S1 connection is established to the current serving base station (or the suspended S1 connection is re-activated).

When the network has data to send to an RRC idle UE, it triggers an appropriate paging procedure in the last known area (tracking/paging area) for the UE, which causes the base stations within that area to broadcast appropriate paging messages in their cells requesting that particular UE to enter the RRC connected state. When a previously idle mobile telephone has data to send again (or it has been paged for receiving downlink data), in order to be allocated communication resources it initiates a so called RRC connection establishment procedure by sending an appropriately formatted RRC connection request message to the base station (following a so-called Random Access Procedure which ensures that the lower layers, and in particular the Media Access Control (MAC) layer, are set up for communication with the base station).

For the latest developments of the 3GPP standards, the so-called Next Generation (NG) or 5G networks, it is envisaged that UEs may also operate in a new RRC state, or new radio state, referred to as an 'RRC inactive' state (e.g. in 5G), or a 'light-connected' (LC) state/mode (e.g. in LTE/4G). For reasons of simplicity, the term 'inactive state' will be used to refer to both the 5G RRC inactive state and the LTE/4G LC state/mode.

When a UE is in the inactive state, both the control-plane connection (e.g. over the NG2 reference point in 5G or S1-MME for 4G/LTE) and user-plane connection (e.g. over the NG3 reference point in 5G or S1-U for 4G/LTE) between the RAN (base station) and the core network are maintained even after the UE has no more data to send or receive (and hence it is normally configured to enter the RRC idle mode). In other words, even though in the inactive state the UE is seen as operating in idle mode from the RAN's point of view. It will be appreciated that the inactive state may (or may not) also be transparent to the core network (i.e. seen as being connected from the core network's point of view) even though there is no active RRC connection between the base station and the inactive state UE. One of the benefits of this new inactive state is that UEs (IoT devices in particular) that have small and infrequent data transmissions do not need to perform the entire RRC connection establishment procedure every time they have data to send (or receive). Instead, an inactive state capable UE can be configured to resume its existing RRC connection with the current serving base station whenever needed and then return to a more power efficient mode of operation until it has data to send/receive again.

The UE can resume its RRC connection by sending to its current base station information (e.g. a resume ID) identifying the connection to be resumed. This beneficially avoids the base station and the UE having to go through authentication and radio bearer establishment. In order to facilitate such inactive connection and simplified resumption of the connection between the UE and its serving base station, the concept of a so-called anchor base station is being considered by 3GPP. Effectively, the anchor base station is a base station responsible for storing UE Access Stratum (AS) context, caching the UE's user data (UE context) and for providing the user data to other base stations as needed while terminating the NG core network connections (NG2/NG3). For example, the anchor base station may be the first (or previous) base station that the UE registered with in a particular TA (or other pre-defined area). Thus, when the UE attempts to resume its RRC connection via a different base station (within the same area), the new base station can contact the anchor base station and retrieve the UE context along with the cached user data based on information provided by the UE (e.g. resume ID and/or the like). Since in the inactive state the NG2/NG3 connections are maintained, beneficially, the new base station can avoid having to contact the core network and/or establish new NG2/NG3 connections for the UE (although the new base station might need to switch the NG2/NG3 connections from the anchor/previous base station to the new base station). This procedure may be referred to as anchor relocation and it involves switching an NG2/NG3 terminating points from an Anchor base station to a new serving base station whilst transferring the UE context.

The current agreement in 3GPP is that the base station maintains the NG2/NG3 connections while the UE is in the inactive state and that the RAN (as opposed to the core network) is responsible for initiating a notification procedure for reaching the UE when necessary and for configuring the notification related parameters. More specifically, the base station of the RAN is responsible for notifying the UE when a full connection needs to be resumed (e.g. in order to receive downlink data from core network) in a paging-like procedure (referred to as RAN-based notification or RAN-based paging).

In order to facilitate efficient RAN-based notification by a base station, according to recent developments, a UE in the inactive state (e.g. RRC_INACTIVE) can be configured with a RAN-based notification area that is a subset of the corresponding core network registration area for that UE) and which may comprise one or more cells. The RAN-based notification area is UE-specific and configurable by the base station via dedicated signalling. Moreover, direct base station to base station communication via an appropriate interface (e.g. Xn) is available between base stations of the RAN-based notification area. Whilst moving around (and staying within the boundaries of) this RAN-based notification area a UE does not need to initiate any procedures to update its location with the network (i.e. the does not send any "location update" indication). On leaving the area, however, a UE will update its location to the network (e.g. using a location area update or tracking area update procedure). The base station RAN thus remains aware whenever the UE moves from one RAN-based notification area to another.

SUMMARY OF INVENTION

There are a number of different options for the base station to configure the RAN-based notification area. For example, an explicit list of the cell(s) constituting a given RAN-based notification area may be notified to the UE. It will be appreciated that the list may contain only a single entry for implementing a RAN-based notification area comprising a single cell.

In another example, the RAN-based notification area may be configured (e.g. in the network) as one or more distinct RAN areas each having its own respective RAN area identifier (RANAID). Each UE may thus be provided with information identifying one or more RAN Area IDs representing the RAN area(s) (e.g. a list of one or more RAN Area IDs) within which that UE can move without initiating a location area update. To allow the UE to determine whether a particular cell is or is not part of a given RAN area, each cell may broadcast (e.g. in system information) the RAN area ID(s) of the RAN area(s) to which the cell belongs.

It will be appreciated that one, or both, of these examples may be supported. For example, for high mobility UEs, a base station may configure a list of one or more RAN area IDs representing a RAN-based notification area within which a UE may remain in an inactive state. On the other hand, for low mobility UEs, a base station may configure a list of one or more cells representing a RAN-based notification area within which a UE may remain in an inactive state. In this scenario a RAN Area ID broadcast would still be provided by the base station.

An inactive state UE will thus be able to notify the RAN when re-selecting to a cell not belonging to the configured RAN-based notification area (e.g. using the resume procedure to notify the RAN of a RAN-based location area update (RLAU)), in which case the network can decide whether to keep the UE in inactive mode or to 'suspend' the UE (e.g. request it to enter RRC idle mode). The RAN-based location area update (RLAU) via the resume procedure may also be triggered periodically. In this regard, the connection resume message will generally include information that can at least indicate the RAN area update and may include information to enable access control. The UE may also perform a CN level location update when crossing a TA boundary when the UE is in the inactive state (in addition to RAN updates based on RAN areas).

Referring to FIG. 1(a) and FIG. 1(b), planning for tracking areas and RAN areas (where the RAN area example described above is used) is performed by operators and configured via an operations, administration and maintenance (OAM) function. Operator planning should guarantee that any RAN area, of a given RAN-based notification area, is a subset of one tracking area as illustrated in FIG. 1(a). Thus, the scenario illustrated in FIG. 1(b) in which a RAN area crosses two tracking areas should be avoided.

Referring to FIG. 2(a) and FIG. 2(b), it is also beneficial to ensure that the RAN-based notification area is a subset of the core network registration area for a given UE as illustrated in FIG. 2(a). However, the inventors have realised that under current proposals it cannot be guaranteed that the RAN-based notification area is a subset of the core network registration area for a given UE and thus, the scenario illustrated in FIG. 2(b) may arise in which, for a given UE, not all of the RAN areas of its RAN-based notification area are within its core network registration area. Specifically, in the example in FIG. 2(b), the RAN-based notification area comprises RAN Areas of RANA3 which is part of tracking area TA1 and RANA4 and RANA5 which are part of tracking area TA2. However, TA1 is not part of the TAL for the UE's core network registration area that TA2 is part of. Accordingly, the RAN-based notification area of the UE is not a subset of its core network registration areas, which is not ideal. The inventors have understood that this issue may occur, for example, because the core network registration area (corresponding to the TAL) and the RAN-based notification area (i.e. list of RAN area(s) when the RAN area example described above is used) are configured for UEs in separated layers (i.e. the non-access stratum and access stratum layers) and by separated communication entities (i.e. core network node and base station). Thus, whilst the RAN area(s) and tracking area(s) may be planned by operators, the base station may be informed of its cell TAI and RAN area ID, and the base station may broadcast these identifiers in system information, the base station may, nevertheless, configure a RAN-based notification area that overlaps different core network registration areas (i.e. does not form a subset of a single core network registration area).

It will be appreciated that although the issue illustrated in FIG. 2(a) and FIG. 2(b), is described in the context of a RAN-based notification area formed of plural RAN areas a similar issue may also arise even if an explicit list of the cell(s) constituting a given RAN-based notification area is used as opposed to a RAN-based notification area defined by a list of RAN area identities.

The present invention aims to provide methods and apparatus which address, or at least partially ameliorate, the above issues.

In one example aspect there is provided a method performed by a base station in a communication system the method comprising: receiving, from at least one further base station, information identifying at least one respective tracking area associated with at least one cell of each further base station; receiving, from a core network, information identifying a registration area for a user equipment (UE), the registration area comprising at least a tracking area within which the UE is located; defining, based on the received information identifying at least one respective tracking area and the received information identifying a registration area, a radio access network (RAN) based notification area for the UE, wherein the RAN based notification area represents an area within which the UE can move whilst remaining in an inactive state; and sending, to the UE, information defining the RAN based notification area.

In one example aspect there is provided a method performed by a core network function in a communication system the method comprising: defining, a core network registration area for a user equipment (UE), the registration area comprising at least a tracking area within which the UE is located; and providing, to a base station serving the UE, information defining the registration area for the UE.

In one example aspect there is provided a method performed by a user equipment (UE) in a communication system the method comprising: receiving, from at least one base station, information identifying at least one respective tracking area and the received information identifying a registration area, a radio access network (RAN) based notification area for the UE, wherein the RAN based notification area represents an area within which the UE can move whilst remaining in an inactive state; wherein the radio access network (RAN) based notification area for the UE represents an area defined, based on, information identifying at least one respective tracking area and information identifying a registration area, to be a subset of a core network registration area for the UE.

In one example aspect there is provided a base station for a communication system the base station comprising: a controller and a transceiver, wherein the controller is configured to: control the transceiver to: receive, from at least one further base station, information identifying at least one respective tracking area associated with at least one cell of each further base station; and receive, from a core network, information identifying a registration area for a user equipment (UE), the registration area comprising at least a tracking area within which the UE is located; define, based on the received information identifying at least one respective tracking area and the received information identifying a registration area, a radio access network (RAN) based notification area for the UE, wherein the RAN based notification area represents an area within which the UE can move whilst remaining in an inactive state; and control the transceiver to send, to the UE, information defining the RAN based notification area.

In one example aspect there is provided a core network function for a communication system the core network function comprising: a controller and a transceiver, wherein the controller is configured to: define, a core network registration area for a user equipment (UE), the registration area comprising at least a tracking area within which the UE is located; and control the transceiver to provide, to a base station serving the UE, information defining the registration area for the UE.

In one example aspect there is provided a user equipment (UE) for a communication system the UE comprising: a controller and a transceiver, wherein the controller is configured to control the transceiver to receive, from at least one base station, information identifying at least one respective tracking area and the received information identifying a registration area, a radio access network (RAN) based notification area for the UE, wherein the RAN based notification area represents an area within which the UE can move whilst remaining in an inactive state; wherein the radio access network (RAN) based notification area for the UE represents an area defined, based on, information identifying at least one respective tracking area and information identifying a registration area, to be a subset of a core network registration area for the UE.

In one example aspect there is provided a base station for a communication system the base station comprising: means for receiving, from at least one further base station, information identifying at least one respective tracking area associated with at least one cell of each further base station; means for receiving, from a core network, information identifying a registration area for a user equipment (UE), the registration area comprising at least a tracking area within which the UE is located; means for defining, based on the received information identifying at least one respective tracking area and the received information identifying a registration area, a radio access network (RAN) based notification area for the UE, wherein the RAN based notification area represents an area within which the UE can move whilst remaining in an inactive state; and means for sending, to the UE, information defining the RAN based notification area.

In one example aspect there is provided a core network function for a communication system the core network function comprising: means for defining, a core network registration area for a user equipment (UE), the registration area comprising at least a tracking area within which the UE is located; and means for providing, to a base station serving the UE, information defining the registration area for the UE.

In one example aspect there is provided a user equipment (UE) for a communication system the UE comprising: means for receiving, from at least one base station, information identifying at least one respective tracking area and the received information identifying a registration area, a radio access network (RAN) based notification area for the UE, wherein the RAN based notification area represents an area within which the UE can move whilst remaining in an inactive state; wherein the radio access network (RAN) based notification area for the UE represents an area defined, based on, information identifying at least one respective tracking area and information identifying a registration area, to be a subset of a core network registration area for the UE.

In one example aspect there is provided a communication system comprising: a base station; a core network function; and a UE as set out above.

In one example aspect there is provided a computer implementable instructions product comprising computer implementable instructions for causing a programmable communications device to perform the method as set out above.

Although for efficiency of understanding for those of skill in the art, the example aspects of the invention will be described in detail in the context of a 3GPP system (UMTS, LTE, NR), the principles of the example aspects of the invention can be applied to other systems in which communication devices or User Equipment (UE) access a core network using a radio access technology.

Example aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described, by way of example, with reference to the accompanying drawings in which.

DESCRIPTION OF EMBODIMENTS

<Overview>

Figure 3:
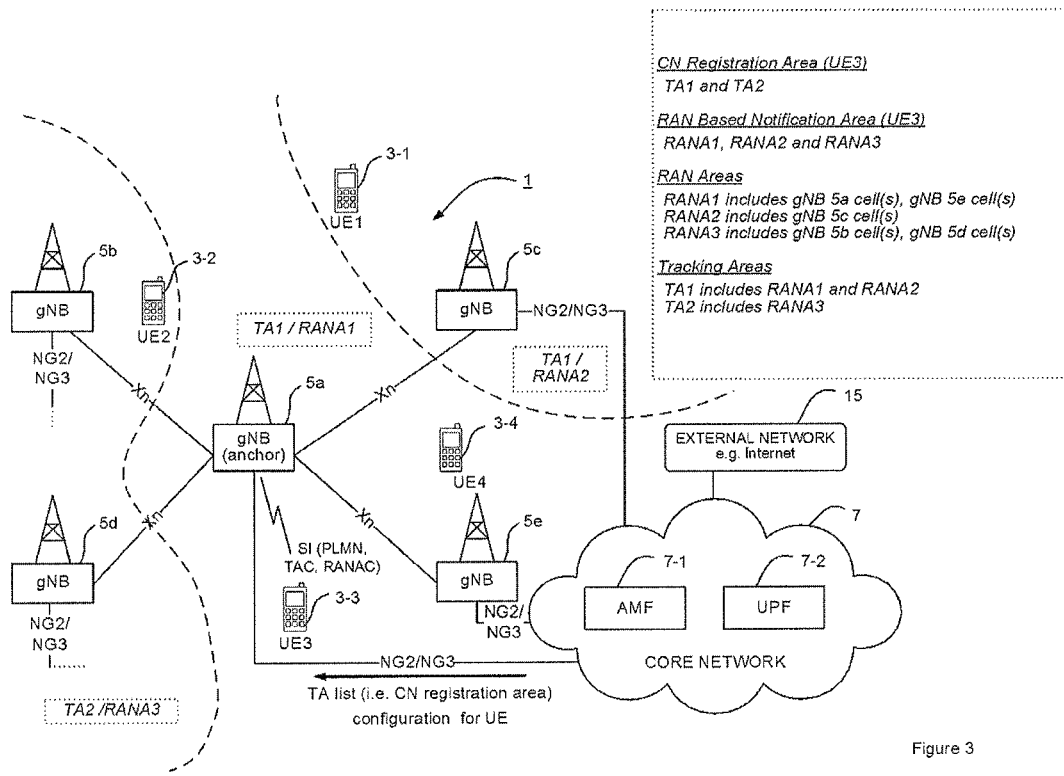
FIG. 3 illustrates schematically a cellular telecommunication system to which example embodiments of the invention may be applied.

FIG. 3 schematically illustrates a telecommunications network 1 in which items of user equipment (UEs) 3-1 to 3-4 (such as mobile telephones, and other communication devices, including IoT devices) can communicate with each other via base stations 5 (in this example gNBs) and a core network 7 using an new radio (NR) radio access technology (RAT). As those skilled in the art will appreciate, whilst four UEs 3 (denoted 'UE1' to 'UE4') and five base stations 5a to 5e are shown in FIG. 3 for illustration purposes, the system, when implemented, will typically include other base stations and communication devices.

Although not shown in FIG. 3, each base station 5 operates one or more associated cells (e.g. base station 5a operates a 'Cell A', base station 5b operates a 'Cell B', and so on).

UEs 3 can connect to an appropriate cell (depending on their location and possibly on other factors, e.g. signal conditions, subscription data, capability, and/or the like) by establishing a radio resource control (RRC) connection with the appropriate base station 5 operating that cell. As can be seen, the first UE 3 is located in an area where it can be served by the cells operated by the base stations 5a or 5b. Thus, when operating in RRC idle mode (not sending/receiving data), the UE 3 camps on the cell having the best signal quality, and when in RRC active mode, the UE 3 communicates data via that cell.

When a UE 3 (e.g. UE3 3-3) first registers with the network (via one of the base stations 5), its serving base station 5 (e.g. gNB 5a) also establishes an associated interface connection for relaying communications (user and control data) between the serving base station 5 and the core network 7.

The base stations 5 are connected to the core network 7 via NG2/NG3 interfaces (or S1-MME/S1-U interface in case of 4G/LTE) and to each other via an Xn interface (X2 interface in 4G/LTE). The core network 7 includes, amongst others, an access and mobility management function (AMF) 7-1 (corresponding generally to a mobility management entity, MME in 4G/LTE), and a user-plane function 7-2 for providing a connection between the base stations 5 and external networks 15 (such as the Internet) and/or servers hosted outside the core network 7.

The AMF 7-1 is the network node responsible for keeping track of the locations of the UEs within the communications network 1 especially when a UE 3 is in RRC_IDLE mode. In particular, the AMF 7-1 stores an identifier of the UEs' last known cell (or tracking area) so that they can be notified when there is an incoming (voice or data) call for them and that a communication path is set up via the base station 5 currently serving the particular UE 3.

In this example, each UE 3 connects to the network periodically (e.g. whenever one of its applications needs to communicate with the network) for sending data to a remote endpoint (e.g. a server or another communication device). Each UE 3 is configured to operate in an RRC inactive state (RRC INACTIVE) in which the network maintains associated NG2/NG3 connections even though the UE 3 appears to be operating in an idle mode from the RAN's point of view. Therefore, between its periodic re-connections, the UE 3 can enter the inactive mode and thus avoid performing handovers (i.e. the UE is able to move freely around the RAN based notification area, whilst remaining in the inactive state, without the UE having to update its location with the core network), as long as it remains within a RAN based notification area configured by its anchor base station 5. It will be appreciated that, whilst use an inactive state is described in the context of a UE that will have periodical data transmission this is only exemplary and use of an inactive state in other cases is also relevant.

The base station 5 serving each UE is responsible for configuring an appropriate RAN based notification area for that UE 3. The RAN area may be configured to comprise one or more cells from the same or different base stations 5. In this example, the RAN based notification area for UE3 3-3 is shown as comprising three RAN areas (RANA1, RANA2, and RANA3). RAN area RANA1 includes cells of gNB 5a and gNB 5e, RAN area RANA2 includes the cell or cells of gNB 5c and RAN area RANA3 includes the cells of gNB 5b and gNB 5d. The core network registration area for UE3 3-3 is configured within the core network (e.g. by the AMF 7-1) and comprises a tracking area list (TAL) comprising, in this example, two tracking areas TA1 and TA2 where TA1 includes RAN area RANA1 and RAN area RANA2 and TA2 includes RAN area RANA3. It will be appreciated that the RAN based notification area and core network registration area configurations shown in and described with reference to FIG. 3 are purely for illustration and that any suitable configuration is possible. Moreover, it will be appreciated that the configurations are UE specific and may be changed dynamically.

In the example shown in FIG. 3, RAN areas having associated RAN area IDs are configured and, accordingly a RAN based notification area for a given UE 3 may be configured by providing a list of one or more RAN area IDs representing that RAN based notification area (although configuration of a RAN notification area for a given UE using an explicit lists of cells may also be implemented as an option).

Figure 4:
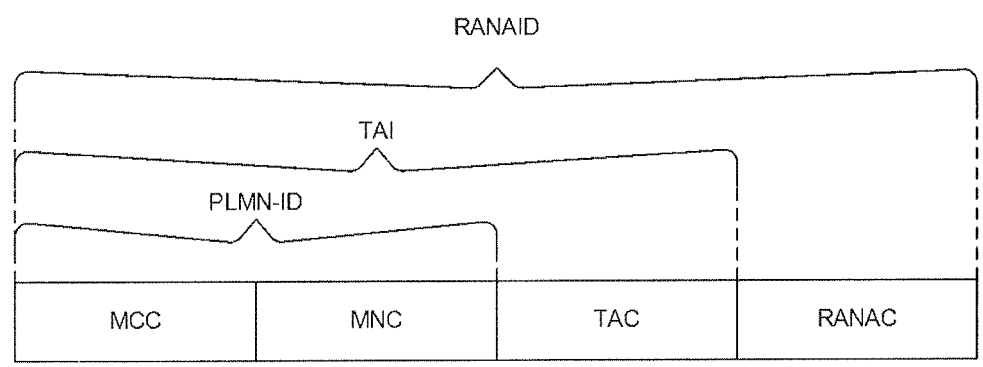
FIG. 4 illustrates a mechanism for identifying a RAN area that may be implemented in the system shown in FIG. 3.

Beneficially, referring to FIG. 4 that illustrates a mechanism for identifying a RAN area that may be implemented in the system shown in FIG. 3, the RAN areas are uniquely identified by means of a 'global RAN area ID (RANAID)' that is a combination of a tracking area identity (TAI) that uniquely identifies the tracking area and a RAN area code (RANAC) which uniquely identifies the RAN area within the tracking area represented by the TAI. The TAI is an aggregate identifier comprising a public land mobile network (PLMN) identity and a tracking area code (TAC) which identifies the tracking area in question within the identified PLMN. Thus, the same TAC may be used for different PLMNs and the same RANAC may be used for different tracking areas. As seen in FIG. 4, the PLMN identity is also an aggregate identifier comprising a mobile county code (MCC) and mobile network code (MNC) for the PLMN. It can be seen, therefore, that any RAN area identified in this way is inherently within (a subset of) a particular tracking and will not overlap more than one tracking area.

Referring back to FIG. 3, the tracking area to which a base station belongs is informed to UEs in its cell(s) by means of broadcast system information (SI—e.g. system information block 1). The broadcast system information comprises a TAC information element and an information element comprising a list of one or more PLMNs. The TAC identified by the TAC information element is common to each PLMN listed. In this example, the system information broadcast base station 5 also comprises (in the same or a different system information block) the RAN area code for the cell.

Thus, the RAN area identity is coded such that the TAI is a part of RAN area identity (e.g. the global RAN area ID={Tracking area ID, RAN area code within TA}). Since the base station 5 broadcasts the TAC and the RAN area Code within TA, the UE simply needs to interpret that the global RAN area ID as being equal to the TAI in combination with the RAN area Code within TA.

Beneficially, neighbouring base stations exchange (e.g. via the Xn interface) cell information with each other, including tracking area information (i.e. TAIs for TAs which the cell(s) of the base stations form part of). Similarly, in this example, RAN area information (e.g. the RAN area ID or RAN area code to be used in conjunction with a TAI) for neighbour cells is provided by the corresponding neighbouring base stations (although it will be appreciated that this information may alternatively or additionally be provided by an operations, administration and maintenance function (OAM)).

Beneficially, the core network (e.g. a core network control function such as the AMF 7-1) informs the base station of the TA list configuration for a given UE (and hence the core network registration area configuration for that UE). The information on the TA list may, for example, be provided during an initial UE context setup procedure and/or may be provided following a tracking area update.

Thus, when a base station 5 decides to put a UE 3 into an inactive state the base station can beneficially configure a RAN-based notification area for that UE 3 either: using a list of one or more RAN areas which belong to tracking area(s) forming part of the tracking list for that UE 3; or using an explicit list of one or more cells within tracking area(s) forming part of the tracking list for that UE 3.

Whilst the example described with reference to FIG. 3 uses the concept of RAN areas comprising one or more cells, it will be appreciated that a similar (albeit simpler) procedure may be used beneficially to help ensure that the RAN-based notification area is a subset of the core network registration area for a given UE.

More specifically, if RAN areas are not implemented, the neighbouring base stations may simply exchange (e.g. via the Xn interface) cell information with each other, including tracking area information (i.e. TAIs for TAs which the cell(s) of the base stations form part of) without any RAN area information needing to be provided. As with the procedure involving RAN areas, the core network (e.g. a core network control function such as the AMF 7-1) may inform the base station of the TA list configuration for a given UE (and hence the core network registration area configuration for that UE).

The information on the TA list may, for example, be provided during an initial UE context setup procedure and/or may be provided following a tracking area update.

Thus, when a base station 5 decides to put a UE 3 into an inactive state the base station can beneficially configure a RAN-based notification area for that UE 3 using an explicit list of one or more cells within tracking area(s) forming part of the tracking list for that UE 3.

It can be seen, therefore, that by providing the base station with sufficient information to allow the base station to determine which other cells (and/or RAN areas) form part of a given TA, the above procedures help to ensure that the RAN-based notification area is a subset of the core network registration area for a given UE.

<UE>

Figure 5:
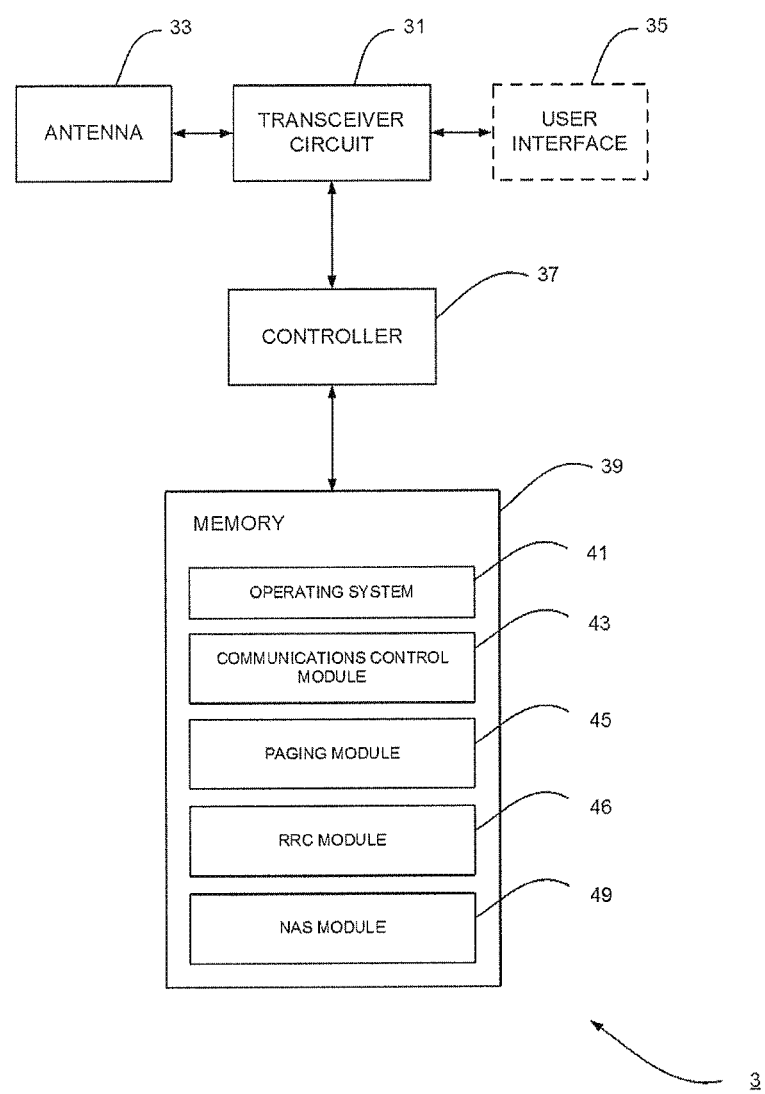
FIG. 5 is a block diagram of a UE forming part of the system shown in FIG. 3.

FIG. 5 is a block diagram illustrating the main components of the UE 3 shown in FIG. 3 (e.g. a mobile telephone or an IoT device). As shown, the UE 3 has a transceiver circuit 31 that is operable to transmit signals to and to receive signals from a base station 5 via one or more antenna 33. The UE 3 has a controller 37 to control the operation of the UE 3. The controller 37 is associated with a memory 39 and is coupled to the transceiver circuit 31. Although not necessarily required for its operation, the UE 3 might of course have all the usual functionality of a conventional mobile telephone (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the UE 3 by, in this example, program instructions or software instructions stored within memory 39. As shown, these software instructions include, among other things, an operating system 41, a communications control module 43, a paging module 45, an RRC module 46, and a NAS module 49.

The communications control module 43 is operable to control the communication between the UE 3 and its serving base station 5 (and other communication devices connected to the serving base station 5, such as other user equipment, core network functions, etc.).

The paging module 45 is responsible for maintaining a RAN based notification area (e.g. in the form of a list of cells and/or RAN areas) in which the UE 3 can be paged, and to control the transceiver 31 to monitor for paging/notification messages addressed to the UE 3. The paging module 45 is also responsible to notify the other modules (e.g. the RRC module 46 and the NAS module 49, as appropriate) when the UE 3 is about to leave (or when it has left) the currently configured RAN paging area (for example, in order to perform an appropriate location update procedure).

The RRC module 46 is operable to generate, send and receive signalling messages formatted according to the RRC standard. For example, such messages are exchanged between the UE 3 and its serving base station 5. The RRC messages may include, for example, messages relating to configuring a RAN based notification area for the UE 3.

The NAS module 49 is operable to generate, send and receive signalling messages formatted according to the NAS standard. For example, such messages are exchanged between the UE 3 and the AMF 7-1 (via the serving base station 5, using the RRC module 46). The NAS messages may include, for example, messages relating to registering and/or updating a tracking area (or cell) where the UE 3 is currently located.

<Base Station>

Figure 6:
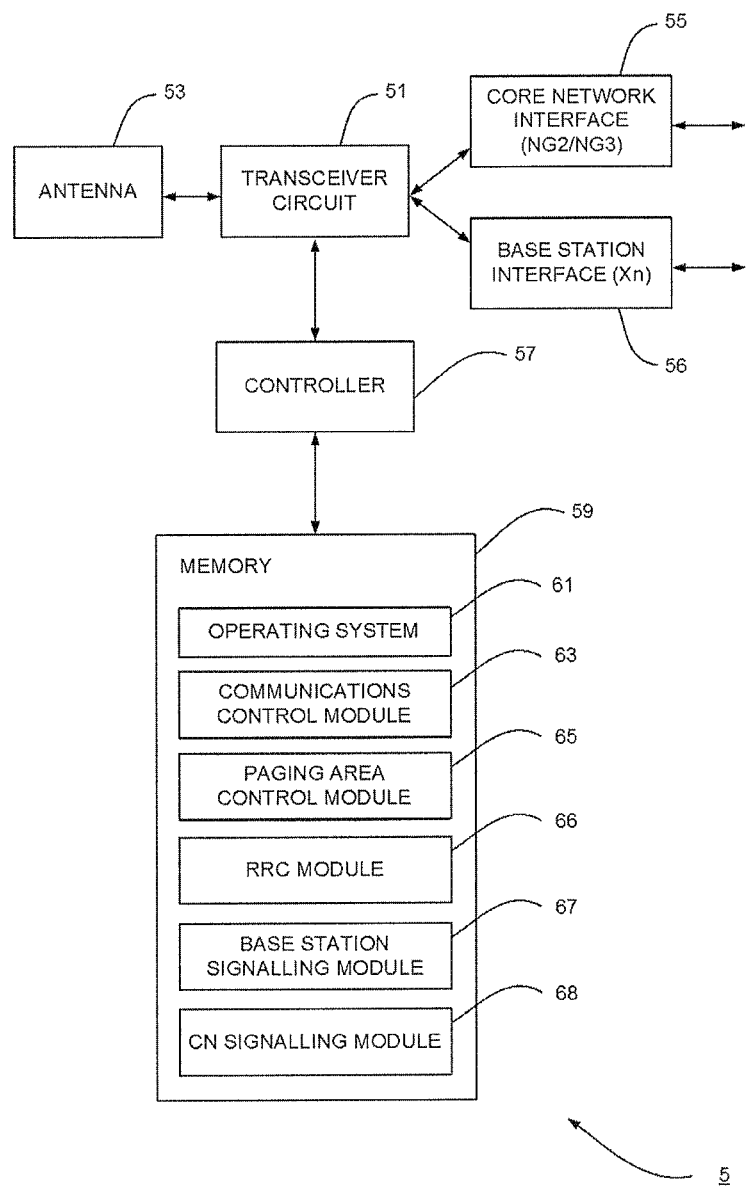
FIG. 6 is a block diagram of a base station forming part of the system shown in FIG. 3.

FIG. 6 is a block diagram illustrating the main components of a base station 5 shown in FIG. 3. As shown, the base station 5 has a transceiver circuit 51 for transmitting signals to and for receiving signals from user equipment (such as the UE 3) via one or more antenna 53, a core network interface 55 (e.g. an S1 interface, NG2 and/or NG3 interface, and/or the like) for transmitting signals to and for receiving signals from the core network 7, and a base station interface 56 (e.g. an X2 interface, Xn interface, and/or the like) for transmitting signals to and for receiving signals from neighbouring base stations. The base station 5 has a controller 57 to control the operation of the base station 5. The controller 57 is associated with a memory 59. Although not necessarily shown in FIG. 3, the base station 5 will of course have all the usual functionality of a cellular telephone network base station and this may be provided by any one or any combination of hardware, software and firmware, as appropriate. Software may be pre-installed in the memory 59 and/or may be downloaded via the communications network 1 or from a removable data storage device (RMD), for example. The controller 57 is configured to control the overall operation of the base station 5 by, in this example, program instructions or software instructions stored within memory 59. As shown, these software instructions include, among other things, an operating system 61, a communications control module 63, a paging area control module 65, an RRC module 66, a base station signalling module 67, and a CN signalling module 68.

The communications control module 63 is operable to control the communication between the base station 5 and the UE 3 (user equipment) and other network entities that are connected to the base station 5. The communications control module 63 also controls the separate flows of downlink user traffic (via associated data radio bearers) and control data to be transmitted to the UEs associated with this base station 5. Control data may include, for example, control data for managing operation of the UE 3 (e.g. NAS, RRC, paging, system information, and/or the like).

The paging area control module 65 is responsible for configuring and maintaining, for each UE for which the base station 5 acts as an anchor, an appropriate RAN based notification area. The paging area control module 65 is also responsible for controlling the transceiver 51 to perform paging/notification of UEs 3, when appropriate (e.g. when there is downlink data to send to a particular UE 3 that is not in RRC connected mode). The paging area control module 65 configures the RAN based notification area for a given UE based on information, such as tracking area information and/or RAN area information (if appropriate) received from one or more other base stations (e.g. neighbouring base stations) and a tracking area list (TAL) for that UE received from the core network (e.g. from an AMF 7-1, MME or the like).

The RRC module 66 is operable to generate, send and receive signalling messages formatted according to the RRC standard. For example, such messages are exchanged between the base station 5 and the UE 3 (and other user equipment within the cell of the base station 5). The RRC messages may include, for example, messages relating to configuring a RAN based notification area for the UE 3.

The base station signalling module 67 is operable to generate, send and receive signalling messages (X2/Xn messages) formatted according to an appropriate base station to base station application protocol (e.g. an XnAP or an X2AP). The X2/Xn messages may include, for example, messages relating to paging a UE 3, data forwarding, transferring/fetching of UE context (and other information relating to the UE 3) between neighbouring base stations, exchanging information, such as tracking area information and/or RAN area information (if appropriate) with one or more other base stations (e.g. neighbouring base stations), etc.

The CN signalling module 68 is operable to generate, send and receive signalling messages formatted according to an appropriate base station to core network signalling protocol (e.g. an NG2/NG3 AP or an S1AP). For example, such messages are exchanged between the base station 5 and the AMF 7-1/UPF 7-2. The messages may include, for example, messages relating to registering the location and/or operating state of user equipment in a cell of the base station 5, obtaining a TA list from the core network for a particular UE, requesting paging for a particular UE 3, and/or associated responses.

<Access and Mobility Management Function>

Figure 7:
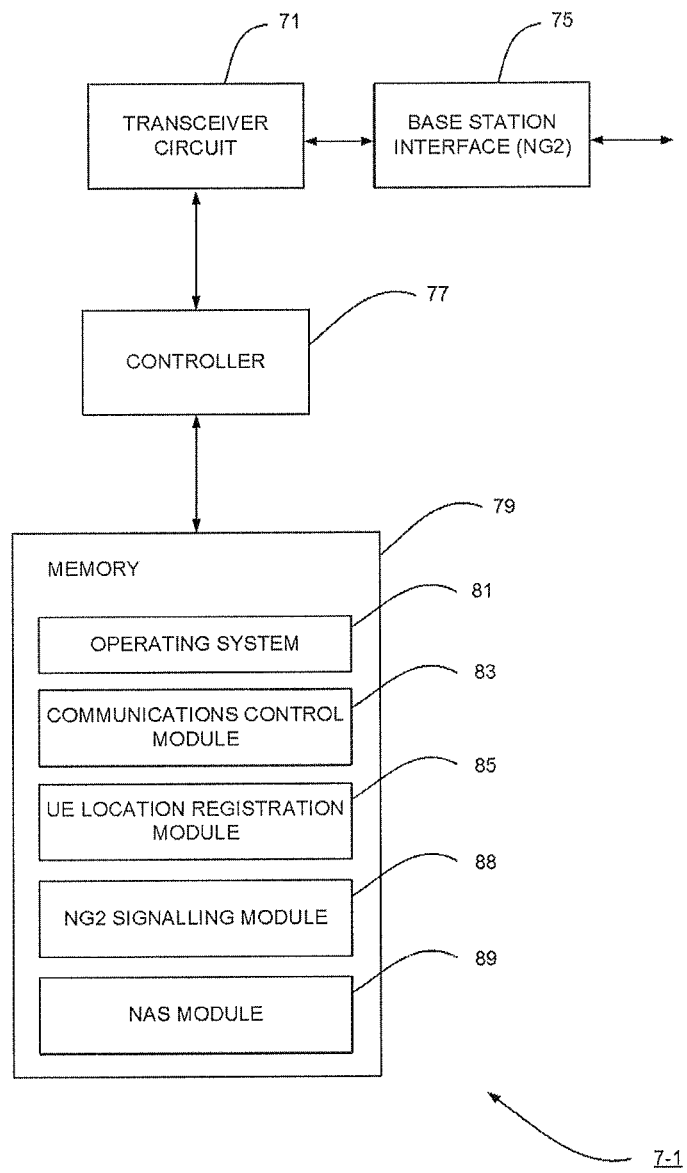
FIG. 7 is a block diagram of a core network function forming part of the system shown in FIG. 3.

FIG. 7 is a block diagram illustrating the main components of the access and mobility management function 7-1 (or similar mobility management entity) shown in FIG. 3. As shown, the access and mobility management function 7-1 has a transceiver circuit 71 for transmitting signals to and for receiving signals from the base stations 5 (and/or UEs 3 connected to the base stations 5) via a base station interface 75 (e.g. an NG2 interface). The access and mobility management function 7-1 has a controller 77 to control the operation of the access and mobility management function 7-1. The controller 77 is associated with a memory 79. Although not necessarily shown in FIG. 7, the access and mobility management function 7-1 will of course have all the usual functionality of a cellular telephone network access and mobility management function/mobility management entity and this may be provided by any one or any combination of hardware, software and firmware, as appropriate. Software may be pre-installed in the memory 79 and/or may be downloaded via the communications network 1 or from a removable data storage device (RMD), for example. The controller 77 is configured to control the overall operation of the access and mobility management function 7-1 by, in this example, program instructions or software instructions stored within memory 79. As shown, these software instructions include, among other things, an operating system 81, a communications control module 83, a UE location registration module 85, an NG2 signalling module 88, and a NAS module 89.

The communications control module 83 is operable to control the communication between the access and mobility management function 7-1 and the base stations 5, the UEs 3, and other network entities that are connected to the access and mobility management function 7-1.

The UE location registration module 85 is responsible for keeping track of current location and state (e.g. idle or connected) of user equipment connected to the access and mobility management function 7-1.

The NG2 signalling module 88 is operable to generate, send and receive signalling messages formatted according to an appropriate application protocol for signalling over the NG2 interface between the access and mobility management function 7-1 and the base stations. The NG2 messages may include, for example, messages relating to registering the location and/or operating state of user equipment in a cell of the base station 5, providing a TA list to for a particular UE 3 to a base station, requesting paging for a particular UE 3, and/or associated responses.

The NAS module 89 is operable to generate, send and receive signalling messages formatted according to the NAS standard to and from a UE 3. For example, such messages are exchanged between the access and mobility management function 7-1 and the UE 3 (via a base station 5). The NAS messages may include, for example, messages relating to registering and/or updating a tracking area (or cell) where the UE 3 is currently located.

In the above description, the UE 3, the base station 5, and the access and mobility management function 7-1 are described for ease of understanding as having a number of discrete modules (such as the communications control modules and the RRC modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A more detailed description will now be given (with reference to FIGS. 5 to 10) of various ways in which a RAN based paging area can be configured for a UE (which may be operating in LC state/mode).

<Operation—First Example>

Figure 8:
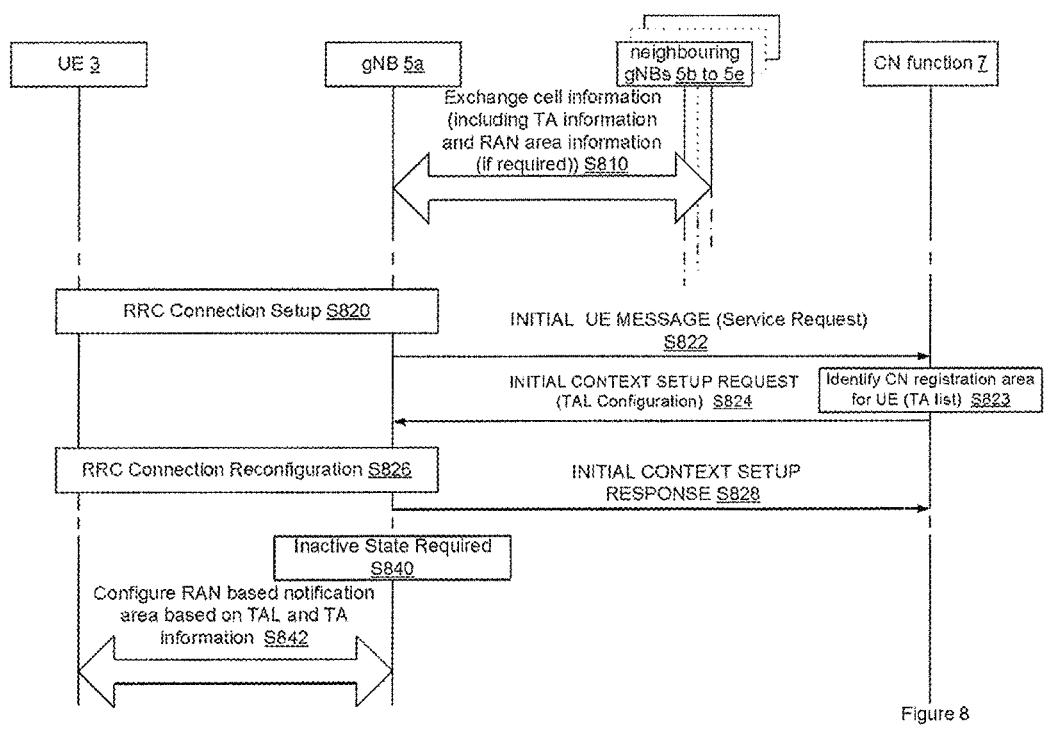
FIG. 8 is a message sequence chart illustrating an exemplary process which may be performed by components of the system shown in FIG. 3.

FIG. 8 is a message sequence chart illustrating an exemplary process which may be performed by components of the system 1 to ensure that a configured RAN based notification area for a given UE 3 is a subset of a core network registration area for that UE 3.

As seen at S810, neighbouring base stations 5 exchange cell information with each other. The cell information provided by each base station 5 comprises respective tracking area information (e.g. the tracking area identity) for the cell(s) operated by that base station. The base stations store the information received from other base stations 5 as part of this exchange. Where RAN areas are used the cell information may further comprise RAN area information (e.g. the RAN area ID or RAN area code to be used in conjunction with a TAI) for the cell(s) operated by the corresponding neighbouring base station 5 (although it will be appreciated that this information may alternatively or additionally be provided by an operations, administration and maintenance function (OAM)).

In this exemplary procedure, information identifying a core network registration area for a particular UE is provided using an initial UE context procedure as shown between S820 and S828. For example, when a UE 3 and a particular base station perform an RRC connection setup procedure as illustrated at S820, and a base station 5a sends an initial UE message (e.g. including an appropriate service request) to a core network function 7 (e.g. the AMF 7-1), the core network function identifies the CN registration area for that UE 3 at S823 and responds to the base station 5 at S824 with an initial context request message including information identifying the CN registration area for the UE 3 (e.g. a TA list of one or more TAIs for the TAs of the CN registration area). This information is stored at the base station 5 in association with information identifying the associated UE. The base station 5 and UE 3 may then engage in an RRC Connection Reconfiguration procedure as appropriate (e.g. as illustrated at S826) and when this is completed send an appropriately formatted initial context setup response to the base station at S828 to report to the core network function 7, successful establishment of the security procedures with the UE 3 and the success/failure of establishment of any radio bearers.

Thus, when a base station 5 decides to put a UE 3 into an inactive state at S840, the base station 5 can beneficially configure a RAN-based notification area for that UE 3 at S842 either: using a list of one or more RAN areas which belong to a tracking area(s) forming part of the tracking list for that UE 3; or using an explicit list of one or more cells within tracking area(s) forming part of the tracking list for that UE 3.

<Operation—Second Example>

Figure 9:
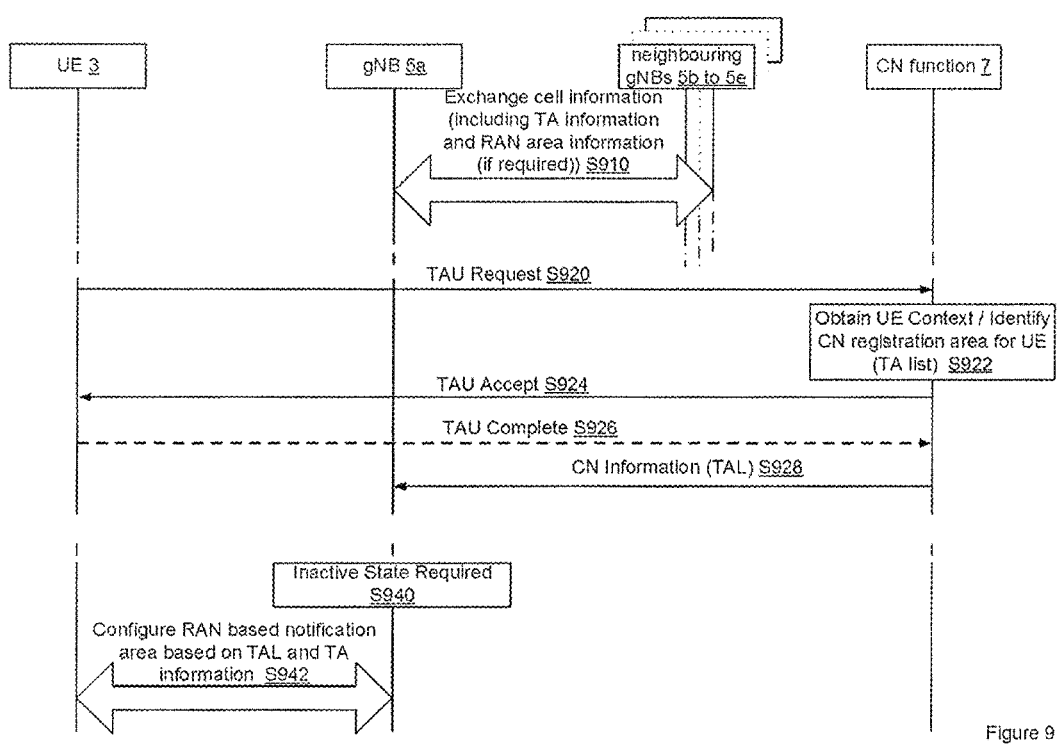
FIG. 9 is another message sequence chart illustrating an exemplary process which may be performed by components of the system shown in FIG. 3.

FIG. 9 is a message sequence chart illustrating another exemplary process which may be performed by components of the system 1 to ensure that a configured RAN based notification area for a given UE 3 is a subset of a core network registration area for that UE 3.

As seen at S910, neighbouring base stations 5 exchange cell information with each other in much the same way as illustrated in FIG. 8. Like the procedure of FIG. 8, the cell information provided by each base station 5 comprises respective tracking area information (e.g. the tracking area identity) for the cell(s) operated by that base station. The base stations store the information received from other base stations 5 as part of this exchange. Where RAN areas are used the cell information may further comprise RAN area information (e.g. the RAN area ID or RAN area code to be used in conjunction with a TAI) for the cell(s) operated by the corresponding neighbouring base station 5 (although it will be appreciated that this information may alternatively or additionally be provided by an operations, administration and maintenance function (OAM)).

Unlike the procedure of FIG. 8, however, in this exemplary procedure, information identifying a core network registration area for a particular UE is provided using an tracking area update (TAU) procedure as shown between S920 and S928. For example, when a UE 3 determines that a tracking area update is required it initiates a tracking area update by sending, to a core network function 7 (e.g. the AMF 7-1) a tracking area update request at S920. The core network function 7 obtains appropriate context information for the UE 3 and determines an appropriate CN registration area for that UE 3 at S922. Assuming the tracking area update request is accepted the core network function 7 responds to the UE 3 with an appropriately formatted tracking area update accept message at S924. The UE 3 may, optionally, respond to the tracking area update accept message with an appropriately formatted tracking area update complete message (e.g. if a modified Globally Unique Temporary ID (GUTI) is included in the tracking area update accept message).

Whilst the tracking area updates are sent via the base station they are non-access stratum (NAS) messages that are transparent to the base station, accordingly, the base station cannot determine CN registration area from the tracking area update accept message. Accordingly, (substantially immediately) following the tracking area update procedure, the CN function 7 sends, to the base station 5 CN information identifying the CN registration area for the UE 3 (e.g. a TA list of one or more TAIs for the TAs of the CN registration area). This information is stored at the base station 5 in association with information identifying the associated UE.

Thus, when a base station 5 decides to put a UE 3 into an inactive state at S940, the base station 5 can beneficially configure a RAN-based notification area for that UE 3 at S942 either: using a list of one or more RAN areas which belong to a tracking area forming part of the tracking list for that UE 3; or using an explicit list of one or more cells within tracking area(s) forming part of the tracking list for that UE 3.

<Modifications and Alternatives>

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It will be appreciated that example embodiments of the invention may be particularly beneficial for Internet of Things (or machine-type) data transmissions (e.g. transmission of data acquired during measurement events and the like). However, it will be appreciated that the example embodiments are also beneficially for transmission of any form of data depending on the application in which the UE is being used. For example, the above example embodiments may be applicable for transmitting data such as user data, backup data, synchronisation data, diagnostic data, monitoring data, usage statistics, error data and/or the like.

Figure 1:
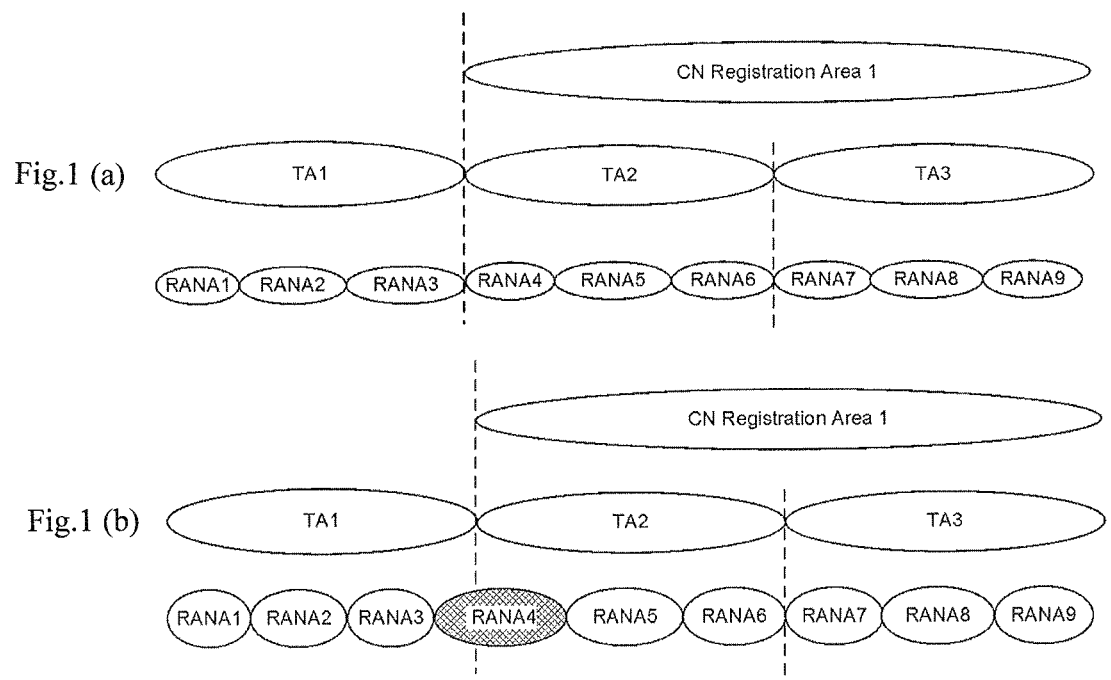
FIG. 1(a) and FIG. 1(b), illustrate an issue associated with a radio access network (RAN) area that does not properly form a subset of a tracking area.
Figure 2:
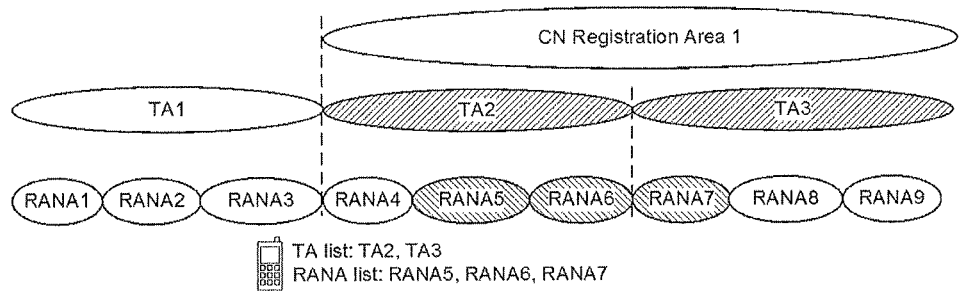
FIG. 2(a) and FIG. 2(b), illustrate an issue associated with the configured radio access network (RAN) area list representing a particular RAN based notification area that does not properly form a subset of the configured tracking area list representing a particular core network registration area for a given UE.
Figure 2:
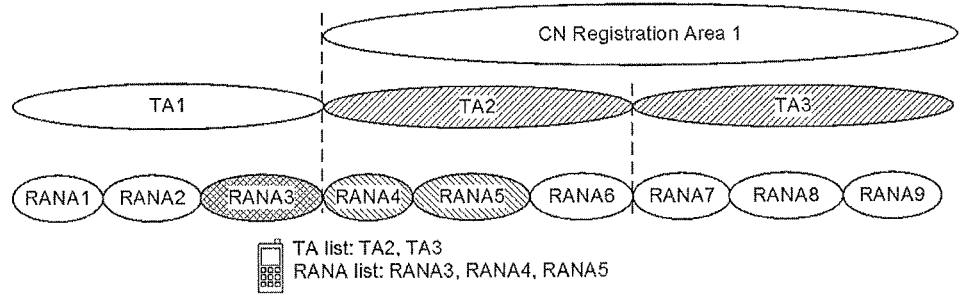

For simplicity, the base station 5a is described to be the anchor base station for each UE (UE1 to UE4) in FIG. 1(a) and FIG. 1(b). However, it will be appreciated that different UEs may have different associated anchor base station (even within the same cell) and that the anchor base station for a given UE may change, when appropriate. In other words, more than one base station may be configured to act as anchor base station (for one or more UEs), albeit only one anchor base station is used per UE.

In FIG. 3, an Xn interface is provided between two neighbouring base stations and an NG2/NG3 interface is provided between each base station and the core network. However, it will be appreciated that in other systems, a different base station to base station interface and/or a different base station to core network interface may be provided. For example, in 4G/LTE systems the interface between neighbouring base stations is referred to as the 'X2' interface and the interface between a base station and the core network is referred to as the 'S1' interface. In 4G systems, base stations are referred to as eNBs.

In the above description, when an explicit list of cells (cell IDs) that belong to a particular RAN based notification area is used to inform the UE of the RAN based notification area configuration, the list may include the respective tracking area codes/identifiers for each cell. It will be appreciated that this allows the UE and the base station to uniquely identify cells across multiple tracking areas (in which the same cell IDs might be reused). However, it will be appreciated that a RAN based notification area may also be defined using a list of cell IDs only (i.e. without tracking area codes/identifiers).

It will be appreciated that the anchor base station may be configured to consider neighbour topology and/or (state of) X2/Xn connections with its neighbour base stations when determining which cells to add/remove to/from the RAN based notification area. For example, neighbour base station may be configured to exchange information with each other about changes in their configuration (also including changes in their X2/Xn connection to other base stations) which might require removal of a cell from the RAN based notification area (or a RAN area).

It will be appreciated that the RAN base notification area may also be referred to as a RAN based routing area or a RAN based paging area.

In the above description, the UE, the base station, and the AMF are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above example embodiments, a number of software modules were described. As those skilled in the art will appreciate, the software modules may be provided in compiled or un-compiled form and may be supplied to the base station, to the AMF, to the UE as a signal over a computer network, or on a recording medium. Further, the functionality performed by part or all of this software may be performed using one or more dedicated hardware circuits. However, the use of software modules is preferred as it facilitates the updating of the base station, the mobility management entity, or the UE in order to update their functionalities.

It will be appreciated that the controllers referred to in the description of the UE, the base station, and the AMF (i.e. with reference to FIGS. 5 to 7) may comprise any suitable controller such as, for example an analogue or digital controller. Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

Whilst specific hardware apparatus having a specific physical structure (e.g. controllers and transceiver circuitry) have been disclosed for performing the various procedures described herein, each step of the methods disclosed in the description and/or forming part of the claims, may be implemented by any suitable means for performing that step. In accordance with this each example method aspect of the invention has a corresponding example apparatus aspect comprising respective means for performing each step of that example method aspect.

One example described herein comprises a method performed by a base station in a communication system the method comprising: receiving, from at least one further base station, information identifying at least one respective tracking area associated with at least one cell of each further base station; receiving, from a core network, information identifying a registration area for a user equipment (UE), the registration area comprising at least a tracking area within which the UE is located; defining, based on the received information identifying at least one respective tracking area and the received information identifying a registration area, a radio access network (RAN) based notification area for the UE, wherein the RAN based notification area represents an area within which the UE can move freely, whilst remaining in an inactive state, without the UE needing to update its location with the core network; and sending, to the UE, information defining the RAN based notification area.

The information identifying a registration area for a UE may be received: as part of an initial UE context setup procedure for the UE (e.g. in an initial UE context setup request message; or as part of (or following, e.g. directly after) a tracking area update procedure for the UE. The information identifying at least one respective tracking area associated with at least one cell of each further base station may be received, for a given further base station, over a direct base station-to-base station interface or reference point (e.g. and X2 or Xn interface) with that base station.

The method may further comprise receiving information identifying at least one respective RAN area that at least one cell of each further base station forms part of. The defining of a RAN based notification area for the UE may be further based on the received information identifying at least one respective RAN area that at least one cell of each further base station forms part of. Each RAN area may comprise a subset of at least one cell forming (e.g. representing an area smaller than) a tracking area associated with that base station. The information identifying at least one respective RAN area: may be received, for a given further base station, over a direct base station-to-base station interface or reference point (e.g. and X2 or Xn interface) with that base station; and/or may be received from an operations, administration and maintenance (OAM) function.

The information defining the RAN based notification area: may comprise a list of at least one cell, forming the RAN based notification area, and that forms at least part of at least one tracking area that forms part of the registration area for the UE; and/or may comprise a list of at least one RAN area forming the RAN based notification area, wherein each RAN area in the list respectively comprises at least one cell that forms at least part of a tracking area that forms part of the registration area for the UE.

The radio access network (RAN) based notification area may be defined, based on the received information identifying at least one respective tracking area and the received information identifying a registration area, to represent at least one cell that is a subset of cells forming (e.g. to represent an area smaller than) the registration area.

The method may further comprise broadcasting information identifying at least one respective RAN area that at least one cell of said base station forms part of. The information identifying at least one respective RAN area may comprise information identifying at least a tracking area code (TAC) identifying a tracking area (e.g. within a public land mobile network, PLMN) and a RAN area code (RANAC) identifying the RAN area uniquely within the tracking area.

Various other modifications will be apparent to those skilled in the art and will not be described in further detail here.

Some of or all the above-described example embodiments can be described as in the following Supplementary Notes, but are not limited to the following.

(Supplementary Note 1)

A method performed by a base station in a communication system the method comprising:

receiving, from at least one further base station, information identifying at least one respective tracking area associated with at least one cell of each further base station;

receiving, from a core network, information identifying a registration area for a user equipment (UE), the registration area comprising at least a tracking area within which the UE is located;

defining, based on the received information identifying at least one respective tracking area and the received information identifying a registration area, a radio access network (RAN) based notification area for the UE, wherein the RAN based notification area represents an area within which the UE can move whilst remaining in an inactive state; and sending, to the UE, information defining the RAN based notification area.

(Supplementary Note 2)

A method according to Supplementary Note 1 wherein the information identifying a registration area for a UE is received as part of an initial UE context setup procedure for the UE.

(Supplementary Note 3)

A method according to Supplementary Note 2 wherein the information identifying a registration area for a UE is received in an initial UE context setup request message.

(Supplementary Note 4)

A method according to Supplementary Note 1 wherein the information identifying a registration area for a UE is received as part of (or following, e.g. directly after) a tracking area update procedure for the UE.

(Supplementary Note 5)

A method according to any one of Supplementary Notes 1 to 4 wherein the information identifying at least one respective tracking area associated with at least one cell of each further base station is received, for a given further base station, over a direct base station-to-base station interface or reference point (e.g. and X2 or Xn interface) with that base station.

(Supplementary Note 6)

A method according to any one of Supplementary Notes 1 to 5 further comprising receiving information identifying at least one respective RAN area that at least one cell of each further base station forms part of.

(Supplementary Note 7)

A method according to Supplementary Note 6 wherein the defining of a RAN based notification area for the UE is further based on the received information identifying at least one respective RAN area that at least one cell of each further base station forms part of.

(Supplementary Note 8)

A method according to Supplementary Note 6 or 7 wherein each RAN area comprises a subset of at least one cell forming (e.g. representing an area smaller than) a tracking area associated with that base station.

(Supplementary Note 9)

A method according to Supplementary Note 6, 7 or 8 wherein the information identifying at least one respective RAN area is received, for a given further base station, over a direct base station-to-base station interface or reference point (e.g. and X2 or Xn interface) with that base station.

(Supplementary Note 10)

A method according to Supplementary Note 6, 7 or 8 wherein the information identifying at least one respective RAN area is received from an operations, administration and maintenance (OAM) function.

(Supplementary Note 11)

A method according to any one of Supplementary Notes 1 to 10, wherein the information defining the RAN based notification area comprises a list of at least one cell, forming the RAN based notification area, and that forms at least part of at least one tracking area that forms part of the registration area for the UE.

(Supplementary Note 12)

A method according to any one of Supplementary Notes 1 to 10, wherein the information defining the RAN based notification area comprises a list of at least one RAN area forming the RAN based notification area, wherein each RAN area in the list respectively comprises at least one cell that forms at least part of a tracking area that forms part of the registration area for the UE.

(Supplementary Note 13)

A method according to any one of Supplementary Notes 1 to 12 wherein the radio access network (RAN) based notification area is defined, based on the received information identifying at least one respective tracking area and the received information identifying a registration area, to represent at least one cell that is a subset of cells forming (e.g. to represent an area smaller than) the registration area.

(Supplementary Note 14)

A method according to any one of Supplementary Notes 1 to 13 further comprising broadcasting information identifying at least one respective RAN area that at least one cell of said base station forms part of.

(Supplementary Note 15)

A method according to Supplementary Note 14 wherein the information identifying at least one respective RAN area comprises information identifying at least a tracking area code (TAC) identifying a tracking area (e.g. within a public land mobile network, PLMN) and a RAN area code (RANAC) identifying the RAN area uniquely within the tracking area.

(Supplementary Note 16)

A method performed by a core network function in a communication system the method comprising:

defining a core network registration area for a user equipment (UE), the registration area comprising at least a tracking area within which the UE is located; and providing, to a base station serving the UE, information defining the registration area for the UE.

(Supplementary Note 17)

A method performed by a user equipment (UE) in a communication system the method comprising:

receiving, from at least one base station, information identifying at least one respective tracking area and the received information identifying a registration area, a radio access network (RAN) based notification area for the UE, wherein the RAN based notification area represents an area within which the UE can move whilst remaining in an inactive state;

wherein the radio access network (RAN) based notification area for the UE represents an area defined, based on, information identifying at least one respective tracking area and information identifying a registration area, to be a subset of a core network registration area for the UE.

(Supplementary Note 18)

A base station for a communication system the base station comprising:

a controller and a transceiver, wherein the controller is configured to: control the transceiver to:

receive, from at least one further base station, information identifying at least one respective tracking area associated with at least one cell of each further base station; and receive, from a core network, information identifying a registration area for a user equipment (UE), the registration area comprising at least a tracking area within which the UE is located;

define, based on the received information identifying at least one respective tracking area and the received information identifying a registration area, a radio access network (RAN) based notification area for the UE, wherein the RAN based notification area represents an area within which the UE can move whilst remaining in an inactive state; and control the transceiver to send, to the UE, information defining the RAN based notification area.

(Supplementary Note 19)

A core network function for a communication system the core network function comprising:

a controller and a transceiver, wherein the controller is configured to:

define a core network registration area for a user equipment (UE), the registration area comprising at least a tracking area within which the UE is located; and control the transceiver to provide, to a base station serving the UE, information defining the registration area for the UE.

(Supplementary Note 20)

A user equipment (UE) for a communication system the UE comprising:

a controller and a transceiver, wherein the controller is configured to control the transceiver to receive, from at least one base station, information identifying at least one respective tracking area and the received information identifying a registration area, a radio access network (RAN) based notification area for the UE, wherein the RAN based notification area represents an area within which the UE can move whilst remaining in an inactive state;

wherein the radio access network (RAN) based notification area for the UE represents an area defined, based on, information identifying at least one respective tracking area and information identifying a registration area, to be a subset of a core network registration area for the UE.

(Supplementary Note 21)

A communication system comprising: a base station according to Supplementary Note 18; a core network function according to Supplementary Note 19, and a UE according to Supplementary Note 20.

(Supplementary Note 22)

A computer implementable instructions product comprising computer implementable instructions for causing a programmable communications device to perform the method according to any one of Supplementary Notes 1 to 17.

This application is based upon and claims the benefit of priority from United Kingdom Patent Application No. 1712862.0, filed on Aug. 10, 2017, the disclosure of which are incorporated herein in their entirety by reference.

The invention claimed is:

1. A method performed by a user equipment (UE) in a communication system while the UE is in an RRC inactive state, the method comprising:

transmitting, to at least one radio access network (RAN) node, a message for resuming a connection, the message for resuming the connection comprising an indication of a RAN based notification area update; and receiving, from the at least one radio access network (RAN) node after transmission of the message for resuming the connection comprising the indication of the RAN based notification area update and, when the RAN node has determined to send the UE back to an inactive state, information for keeping the UE in the inactive state and for configuring the UE with a RAN based notification area, wherein the RAN based notification area represents an area configured, taking account of a registration area for the UE:

to cover at least one cell;

to be contained within a core network (CN) registration area; and to represent an area within which the UE can move whilst remaining in an inactive state.

2. A user equipment (UE) for a communication system, the UE comprising:
- a transmitter configured to transmit, to at least one radio access network (RAN) node, a message for resuming a connection, the message for resuming the connection comprising an indication of a RAN based notification area update; and
- a receiver configured to receive, from at least one radio access network (RAN) node after transmission of the message for resuming the connection comprising the indication of the RAN based notification area update and, when the RAN node has determined to send the UE back to an inactive state, information keeping the UE in the inactive state and for configuring the UE with a RAN based notification area,
- wherein the RAN based notification area represents an area configured, taking account of the registration area:
  - to cover at least one cell;
  - to be contained within a registration area for the UE; and
  - to represent an area within which the UE can move whilst remaining in an inactive state.

* * * * *